United States Patent [19]

Brouns et al.

[11] 4,376,598
[45] Mar. 15, 1983

[54] IN-SITU VITRIFICATION OF SOIL

[75] Inventors: Richard A. Brouns, Kennewick; James L. Buelt; William F. Bonner, both of Richland, all of Wash.

[73] Assignee: The United States of America as represented by the United States Department of Energy, Washington, D.C.

[21] Appl. No.: 251,663

[22] Filed: Apr. 6, 1981

[51] Int. Cl.³ .............................................. E02D 3/00
[52] U.S. Cl. ..................... 405/258; 175/16; 299/14; 404/79; 405/131; 405/129
[58] Field of Search ............... 405/131, 234, 258, 263, 405/259, 128–130; 404/77, 79; 175/16; 299/14

[56] References Cited

U.S. PATENT DOCUMENTS

| | | | |
|---|---|---|---|
| 1,966,760 | 7/1934 | Irvine | 404/79 |
| 1,993,642 | 3/1935 | Aarts et al. | 175/16 |
| 2,806,818 | 9/1957 | Howard | 175/16 |
| 3,208,674 | 9/1965 | Bailey | 299/14 X |
| 3,443,051 | 5/1969 | Puschner | 405/131 |
| 3,586,624 | 6/1971 | Larson | |
| 3,732,697 | 5/1973 | Dickson | 405/129 |
| 3,988,036 | 10/1976 | Fisher et al. | 299/14 X |
| 4,094,809 | 6/1978 | Ross | |
| 4,097,401 | 6/1978 | Guber et al. | |
| 4,119,561 | 10/1978 | Drobnik et al. | |
| 4,124,483 | 11/1978 | Christenson | 405/258 X |
| 4,139,488 | 2/1979 | Knotik et al. | |

FOREIGN PATENT DOCUMENTS 609386  9/1960  Italy ..................................... 405/131

OTHER PUBLICATIONS

Construction Methods and Equipment, pp. 70–82, Aug. 1954.

Primary Examiner—Dennis L. Taylor

[57] ABSTRACT

A method of vitrifying soil at or below a soil surface location. Two or more conductive electrodes are inserted into the soil for heating of the soil mass between them to a temperature above its melting temperature. Materials in the soil, such as buried waste, can thereby be effectively immobilized.

15 Claims, 6 Drawing Figures

IN-SITU VITRIFICATION OF SOIL

TECHNICAL FIELD

This disclosure related to the solidification of soil by in-situ melting and vitrification, using heat generated in the soil itself between spaced electrodes to which electrical current is applied. It might be utilized for solidifying radioactive waste and surrounding soil at subsurface disposal sites, for solidifying hazardous waste dumps and spills, for bore hole sealing, and for general soil stabilization purposes.

BACKGROUND OF THE INVENTION

Solidification of soil in-situ has previously been accomplished by injecting into the soil reactant chemicals for solidifying compositions of material such as concrete, which mix with the soil to result in formation of a solid mass. Stabilization has also been accomplished in some geological formations by artificially freezing the soil. This method requires continuous monitoring of soil temperature and constant expenditure of energy resources to lower the soil temperature.

This invention arose from an attempt to improve upon the handling of existing buried radioactive waste materials. The solidification of such materials decreases the possibility of radioactive waste invading the biosphere. There is also substantial concern that plants and animals might reach the buried waste materials and somehow spread radioactive isotopes within the surrounding environment. To counter this possibility, some burial dumps are covered by sheets of plastic or concrete covers. While waste burial technology has improved significantly in recent years, there currently are large quantities of waste materials in underground burial locations in both liquid and solid form, some in containers and some not. Reprocessing and safe disposal of such waste by present methods which require removal of the soil and waste materials and costly handling steps prior to final disposal are extremely expensive and involve the possibility of hazardous exposure during such reprocessing.

DISCLOSURE OF THE INVENTION

The method of in-situ vitrification of soil involves inserting at least one pair of electrodes into the soil at spaced positions from one another. An initial electrically conductive resistance path must be provided in the soil across the electrodes. Electrical current is passed through the electrically conductive resistance path by applying current to the electrodes to heat the soil about the path to its melting temperature. This establishes a current-carrying pathway through the molten soil across the electrodes. Application of current to the electrodes is continued until the soil mass between and immediately about them has been melted. After melting of this soil mass, the application of current is terminated. This permits the molten soil to cool and solidify into a vitreous or solid mass. The resulting solid material is a glass, a glass ceramic or a partially devitrified glass having crystals and glass dispersed in a solid matrix.

When used for the immobilization of hazardous waste dumps, the method can be utilized to either cover the waste materials with a vitrified layer produced from the soil above it, or can be carried further to vitrify or solidify all the soil within and surrounding the waste material. If gases are evolved that require treatment they can be contained within an enclosure above the soil surface and processed. Solidification of large areas can be achieved by either a stationary or moving electrode approach. With stationary electrodes, a soil volume slightly larger than that outlined by the electrodes is solidified. Additional electrode sets can be used to solidify adjoining soil. With the moving electrode approach, electrodes move horizontally through the soil, melting as they go leaving vitrified soil behind.

It is an object of this invention to provide a method for solidifying soil without disturbing or excavating the soil or handling of the subsurface soil.

Another object of this invention is to provide a method for solidifying hazardous buried waste materials that does not require any handling of the waste materials themselves.

Another object of the invention is to provide a method for solidifying soil which can be readily accomplished by portable equipment.

A still further object of this invention is to provide a system for sealing in ground structures such as waste dumps, tunnels, or shafts to prevent unwanted leakage.

BEST MODE FOR CARRYING OUT THE INVENTION

This disclosure is concerned with in-situ vitrification of soil for any purpose. It is applicable to many uses such as soil stabilization, closing of bores and sealing of underground areas. It is specifically directed to waste disposal systems. While the following description was developed about waste disposal applications, the scope of this disclosure is not to be limited to the waste treatment field.

Radioactively contaminated soil, such as those that exist in low level waste burial grounds and plutonium burial trenches, are receiving public attention due to their potential for releasing radionuclides to the biosphere. Improved engineered barriers are required at some existing locations to contain the buried waste and surrounding soil to which some radionuclides have migrated. Engineering methods being considered to reduce the rate and extent of radionuclide release include, among others: excavation of the burial grounds followed by repackaging and reburial in shallow land repositories; or conversion of the waste to a less dispersable form. Current studies indicate that the more desirable options currently available for reducing future risks to public safety are costly at best.

According to this disclosure, such waste materials and surrounding soil is immobilized in a stable glass, glass-ceramic, or partially devitrified glass waste form. The method immobilizes buried waste without removal of contaminated soil by imposing an electrical current between electrodes placed in the soil. Temperatures high enough for melting are created by imposing an electrical current between one or more pairs of electrodes placed in the soil.

Alternatively, this method can be used to form a vitreous cover above buried waste locations or about the periphery of the waste materials. Such a cover would restrict the entry by plants or burrowing animals and minimize erosion and leaching of the buried waste materials.

Vitrification of the soil is achieved by creating an electrically heated "in-situ melter." In an industrial-type electrically heated melter, heat is generated in molten glass by passing electrical current between electrodes submerged in the melt. Molten glass, heat and electric current are typically contained by high temperature ceramic materials known as refractories. In an in-situ melter as used in this method, electrodes are inserted into the ground as the waste site and soil replaces the refractory to contain and insulate the melter. If desired, to reduce heat losses and contain volatile materials, a portable insulated dome connected to a gas scrubber can be used as a cover enclosing the ground surface above the melter. Heat losses can also be minimized by maintenance of a cover of unmelted material over the molten pool of sub-surface soil. This can be accomplished by starting up the melter below ground level or by placing overburden on the area prior to start up.

Figure 1:
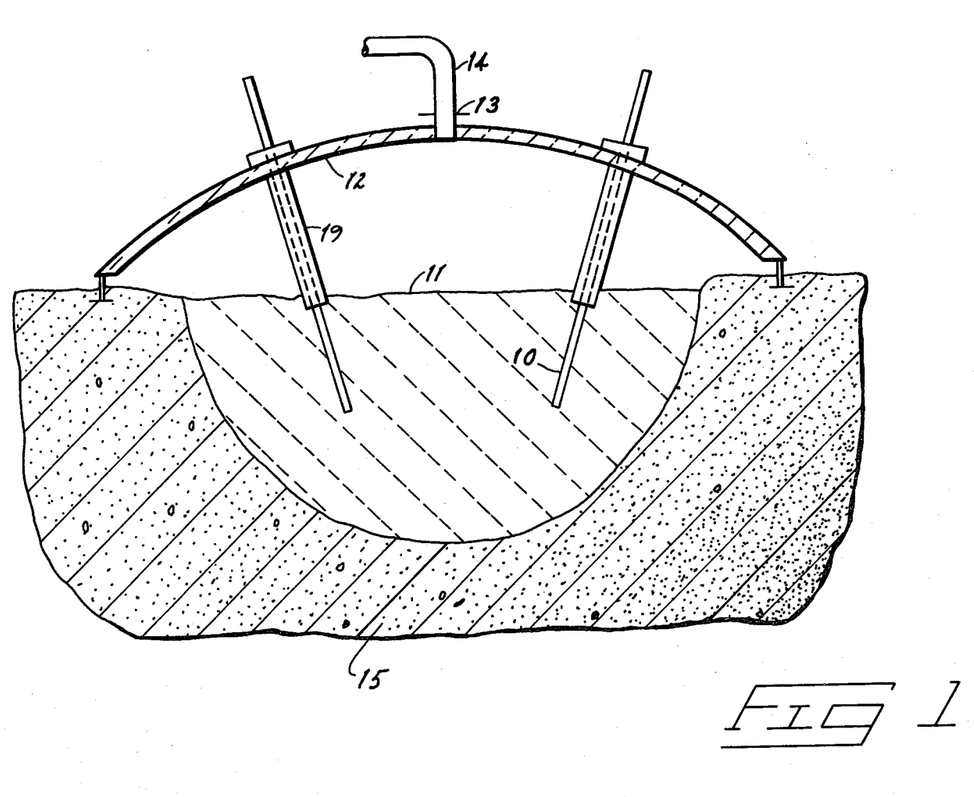
FIG. 1 is a schematic vertical sectional view showing in-situ vitrification.

FIG. 1 schematically illustrates in-situ vitrification. A pair of upright electrodes 10 project into a pool of molten soil 11 formed by the heating of soil and any included buried materials in the space between and immediately surrounding the electrodes 10.

The electrodes 10 are suspended in generally upright positions spaced from one another from an insulated cover or dome 12. They are supplied with electrical current through suitable conductors (not shown) operatively connected to an electrical source of power. Portions of the electrodes 10 can be covered by protective coatings or by a surrounding jacket 19 to prevent oxidation or deterioration of the electrodes along the length of electrode exposed above the pool of molten glass 11.

The dome 12, which is not restricted to hemispherical shapes but may be any shape desired, is vented at 13. Gaseous byproducts that result from the vitrification process can be collected through a conduit 14 for scrubbing or other gas treatment purposes. The pool of molten soil 11 is surrounded by unmelted soil 15, which acts as an insulating refractory.

In general, this method can be applied to the in-situ solidification of any soil mass. The method involves the insertion of at least one pair of electrodes into the soil at locations spanning at least a portion of the soil mass to cause melting of soil in the vicinity of the electrodes. Electrical current is passed through the soil and other materials between the subsoil portions of the electrodes 10 by application of current to them to heat the materials to the soil melting temperature by establishing a current carrying pathway between the electrodes. Once this current carrying pathway is established in a pool of molten soil and/or other materials such as shown at 11 in FIG. 1, the application of current is continued until the desired depth of soil between electrodes 10 has been melted. Application of current to the electrodes is then terminated to permit cooling and solidification of the soil and any remaining materials into a vitrified mass.

FIGS. 3 through 6 schematically illustrate the process steps involved in the application of this method to vitrification of soil and waste materials buried in an elongated trench. The soil is again shown at 15 and the electrodes are again shown at 10. Buried waste material is illustrated as being stored within containers 16 within an elongated subsurface trench having an outline shown by lines 17.

In order to initiate melting of the soil, it is necessary to obtain electrical conduction between electrodes 10. Several startup methods can be utilized. First, a molten sodium hydroxide method might be used, whereby a layer of sodium hydroxide between electrodes 10 is heated to its melting point (300° C.). At this point electrical conductivity between the electrodes 10 is obtained to create sufficient further rise in soil temperature for initial melting of the adjacent soil structure. An alternative method involves heating of a sacrificial resistance element. A metal resistance coil or wire arranged between the electrodes 10 would create sufficient heat for initial melting of the soil. The coil would be eventually consumed in the molten soil. Chemical reagents might be added to the soil to result in a highly exothermic chemical reaction, such as a thermite reaction, generating sufficient heat to melt the soil. Finally, graphite might be placed between the electrodes to conduct electricity in a resistance path from ambient temperature to elevated temperatures sufficiently high to sustain soil melting conditions.

The last-described startup method is illustrated in FIGS. 3 through 6. A horizontal layer of graphite 18 is arranged between electrodes 10 to provide a conductive resistance path across them. The application of current to the electrodes 10 will then heat the graphite 18 and raise the temperature of the soil about the conductive resistance path to its melting temperature. This is illustrated schematically in FIG. 4, where a liquid glass pool 20 is shown as it is forming about the graphite layer 18. The graphite layer 18 and liquid pool 20 establish a current-carrying pathway between electrodes 10 which progressively enlarged as the application of current to electrodes 10 is continued.

Figure 5:
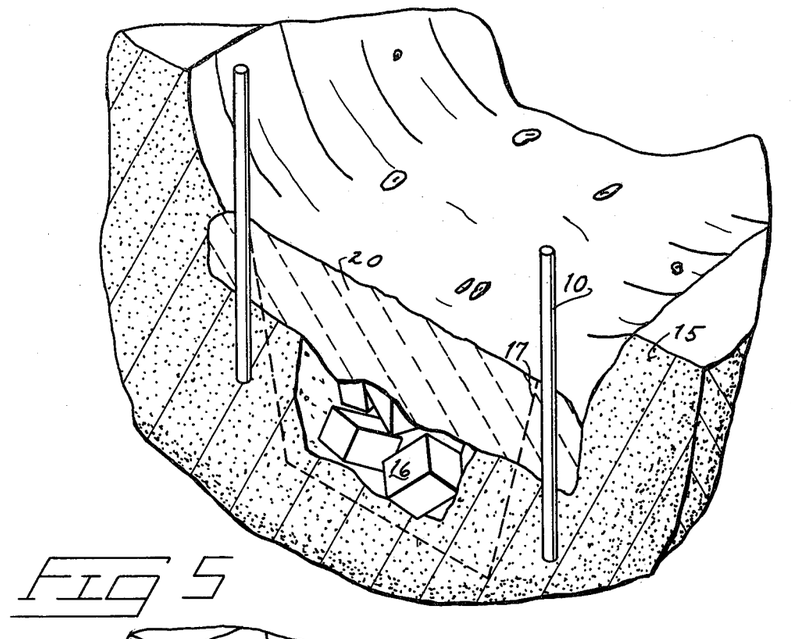
FIG. 5 is a schematic view showing progressive vitrification.
Figure 6:
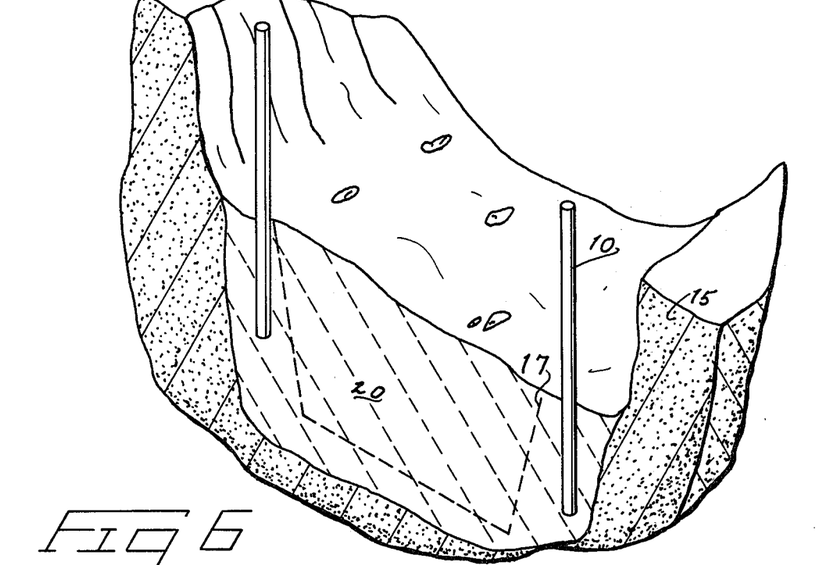
FIG. 6 is a schematic view showing the completed vitrification zone.

FIG. 5 illustrates the process as the liquid pool 20 enlarged both laterally and vertically downward, engulfing the waste materials in containers 16 and raising the temperature of these waste materials to the melting temperature of the surrounding soil. The waste materials will be melted, pyrolized or dissolved in the molten soil mass, depending upon their specific composition. FIG. 6 illustrates complete melting of the waste materials and surrounding soil within the trench confines between the pair of electrodes 10. When the materials have been totally melted, the application of current to the electrodes 10 can be terminated. The electrodes can then be removed for reuse if desired.

It is to be understood that melting of the soil can be terminated prior to complete melting of the burial waste materials if only a cover of vitreous material is desired. This method readily lends itself to the control necessary to cover or encapsulate waste materials buried in soil, as well as to produce a homogeneous vitrified mass of soil and waste materials components.

The resulting vitrified mass will be in the form of a glass, a glass ceramic, or a partially devitrified glass, with crystals and glass dispersed within a solid matrix. Metals within the mass might be dissolved in the glass or will form solid masses at its lower boundaries.

The choice of electrode material and proper electrode placement must be related to the needs to maximize electrode life, to achieve proper melting and to contain the melter to a specific area. As an example, rod-shaped molybdenum or other high temperature materials can be used as the electrode material to allow continuous operation at temperatures up to 1500° C. This will accommodate the typical melting temperature of most soils, which is usually below 1500° C. Since molybdenum oxidizes rapidly in air at temperatures above 600° C., a cooled jacket, an oxygen impervious coating, or other physical protection must be provided about exposed electrode surfaces. The electrodes can be vertically adjustable for changing the depth of the melter and for feeding the electrodes downwardly into the molten pool of material as the electrodes are consumed slowly by the melting process.

The electrodes can be either stationary or moving. The drawings illustrate the method utilizing stationary electrodes, but it is to be understood that the electrodes could be mounted on a crawler moved horizontally along the area to be stabilized. Heat from the electric current will melt the soil ahead of the moving electrodes. The melted soil will solidify after the electrodes pass.

In the stationary system, rod electrodes are driven or drilled into the ground spanning the waste material location. A two phase electrode arrangement with four electrodes equidistant from each other appears most suitable because of the even firing distribution of electrical current between the pairs of electrodes.

Tests have been conducted to monitor radionuclide migration of Pu, U, $^{90}$Sr, $^{\Omega}$Ru, and $^{137}$Cs. These radionuclides were chosen on the basis of being the longest lived, the most volatile and/or the most difficult to encapsulate in a vitrified mass of soil.

Typical soil samples from burial sites in existence today were found to melt between 1450° C. and 1500° C. The composition of such soil is shown in Table 1.

TABLE I

| Hanford Soil Composition | |
|---|---|
| Material | Wt % |
| $SiO_2$ | 62.34 |
| $Al_2O_3$ | 10.97 |
| $Fe_2O_3$ | 6.83 |
| $TiO_2$ | 1.10 |
| Ca | 2.28 |
| Mg | 1.29 |
| Na | 1.91 |
| K | 1.57 |
| C | .68 |
| N | .10 |
| S | .03 |
| $H_2O$ + oxides | 10.90 |

In projecting practical applications of this method, a typical waste disposal trench 5 meters wide by 6 meters deep and 100 meters long has been established as a base size. Specific design of a system for practicing this method is dependent upon factors such as electrical resistivity of the soil and electrode separation. Calculations for a prototypical design shows that 80 hours would be required to vitrify an area 14 feet wide by 14 feet deep by 30 feet long. Average power consumption during that period would be 2000 Kw. Using 20 foot electrode spacing voltage would initially be about 4,000 volts with a current of about 700 amps, with the voltage dropping to about 1600 volts while the current increases to about 950 amp as the melting proceeds.

Laboratory tests using actual burial ground soil containing simulated waste material have been performed. Analysis of the soil outside the vitrification zone for these tests showed no indication of potential radionuclide migration. Pyrolysis of the organic waste materials appears to be complete. The detected levels of carbon monoxide evolved during the tests indicated the degree of complete combustion. Some volatilization or entrainment of inorganic waste materials to the evolved gas was also detected.

Thermocouples were placed in the soil in numerous locations to monitor the vitrification zone and obtain heat transfer data. The 20-cm long molybdenum electrodes with stainless steel extensions were placed in the soil at a 30 cm separation with a layer of graphite spread between them for startup. An effluent sampling system was installed on the apparatus for determining radionuclide volatility and identifying combustion products. A container including samples of cloth, plastic, rubber, metal, ceramic, glass and concrete materials was buried below the surface of the soil. Nonradioactive isotopes of Cs, Ru, and Sr were added to soil placed in the container and mixed with a 15-cm×2-cm thick layer of soil located directly below the container.

To initiate melting, flaked graphite was placed between and behind the electrodes in a trench 44 cm long, 5 cm deep and 2.5 cm wide. The graphite was placed in the lower 2.5 cm of the trench and then covered with 2.5 cm of soil. The resistance of the graphite layer was varied as necessary for these tests by physically disturbing the graphite layer. The voltage ranged between 180 and 220 volts as the current was about 30 amps.

The completed test yielded a vitrified mass of 48.6 kg in 9¾ hours. The vitrified zone encompassed all of the container and simulated contaminated soil. Metal ingots from the metallic wastes were found at two locations at the bottom of the vitrified zone.

A mass spectrometric analysis of the gas evolved from one of these tests is shown in Table 2.

TABLE 2

| Mass Spectrometric Gas Analysis | | | | | | |
|---|---|---|---|---|---|---|
| | Sample Number (mole %) | | | | | |
| | 1 | 2 | 3 | 4 | 5 | 6 |
| $CO_2$ | 0.47 | 0.17 | 0.21 | 0.22 | 0.17 | 0.21 |
| Ar | 9.93 | 0.92 | 9.95 | 0.93 | 0.97 | 0.97 |
| $O_2$ | 19.8 | 21.1 | 21.2 | 21.2 | 21.2 | 21.2 |
| $N_2$ | 76. | 77.4 | 76.9 | 76.5 | 76.9 | 76.9 |
| CO | 2.2 | 0.4 | 0.7 | 1.1 | 0.7 | 0.7 |
| He | 0.01 | 0.01 | 0.01 | 0.01 | 0.01 | 0.01 |
| $H_2$ | 0.01 | 0.01 | 0.01 | 0.04 | 0.02 | 0.01 |
| $CH_4$ | 0.01 | 0.01 | 0.01 | 0.01 | 0.01 | 0.01 |

The carbon monoxide content in the evolved gas is high in samples 1 and 4. Sample 1 was taken when the graphite startup layer was oxidizing. Sample 4 was taken when the combustible container of simulated wastes was being encompassed by the melt. The initial prevalance of carbon monoxide is apparently the result of incomplete combustion of the graphite used during startup. The high carbon monoxide level in sample 4 probably resulted from the gaseous temperatures being too low to permit complete combustion of the gases as they reached the oxidizing conditions at the surface of the soil. Apparently cooling of the gases resulted upon passing through the relatively cold crust that existed above the melt zone during this portion of the test.

The gas scrubber and condensate samples from the tests indicated small amounts of cesium, cadmium, and lead were being volatilized or entrained in the evolved gas above the melt zone, however, no strontium or ruthenium was detected. Samples of the soil at various locations just outside the vitrification zone were also analyzed to detect any migration of simulated waste material through the glass and into the soil. The samples showed no migration outside the vitrified mass.

Glass samples from one test were taken on the centerline of the resulting vitreous mass. The sample identification numbers given with the analytical results in Table 3 correspond to the depth in inches from the top of the glass for each sample. A sample from the bottom of the glass, Sp-7 shows a high concentration of iron. The high iron concentration at this location might indicate there is iron being reduced from the soil by the organic material or that spinel crystals are being formed. In either case, it does not appear to be a problem.

TABLE 3

VITRIFICATION AND SOIL ANALYSIS (wt %)

| | SP-1 | SP-2 | SP-3 | SP-4 | SP-5 | SP-6 | SP-7 | Analysis |
|---|---|---|---|---|---|---|---|---|
| $Al_2O_3$ | 9.80 | 13.10 | 13.40 | 13.60 | 13.70 | 13.70 | 10.10 | 11.70 |
| $B_2O_3$ | .12 | .08 | .04 | .03 | .05 | .07 | .58 | |
| BaO | .06 | .08 | .08 | .08 | .08 | .08 | .06 | .08 |
| CaO | 4.23 | 6.78 | 6.79 | 6.99 | 7.01 | 6.92 | 5.04 | 4.58 |
| $Ce_2O_3$ | | .03 | | | | | | .05 |
| $Co_2O_3$ | .01 | .02 | .01 | .02 | .02 | .01 | .03 | .03 |
| $Cr_2O_3$ | | .03 | .05 | .02 | | | | .02 |
| CuO | | | .03 | | .01 | .02 | .02 | |
| $Fe_2O_3$ | 11.70 | 7.21 | 7.32 | 7.55 | 7.41 | 7.50 | 29.10 | 6.60 |
| $Gd_2O_3$ | | .01 | | | | | | .03 |
| MgO | 2.22 | 3.56 | 3.63 | 3.27 | 3.70 | 3.71 | 2.68 | 2.32 |
| $MnO_2$ | .14 | .23 | .25 | .27 | .23 | .22 | .22 | .15 |
| $MoO_2$ | .01 | .01 | .01 | .03 | .03 | .02 | .02 | .02 |
| $Na_2O_3$ | 3.30 | 4.54 | 4.73 | 4.95 | 5.10 | 4.36 | 4.25 | 5.69 |
| $Nd_2O_3$ | | .01 | | | | | .01 | .04 |
| $P_2O_5$ | .47 | .30 | .16 | .18 | | .31 | 1.11 | .44 |
| PbO | | | | | | | .06 | .09 |
| $RuO_2$ | | | | | | | .07 | |
| $SiO_2$ | 63.30 | 59.50 | 58.0 | 58.2 | 60.10 | 60.60 | 56.10 | 61.80 |
| SrO | .03 | .04 | .05 | .05 | .05 | .05 | .05 | .05 |
| $TiO_2$ | 1.54 | 1.94 | 1.97 | 2.02 | 2.00 | 2.00 | 2.00 | 1.15 |
| Zn | | | | | | | | .02 |
| $ZrO_2$ | .02 | .05 | .04 | .04 | .04 | .05 | .04 | .04 |
| TOTAL | 97.00 | 97.50 | 97.00 | 97.00 | 99.60 | 99.60 | 111.50 | 95.00 |

Figure 2:
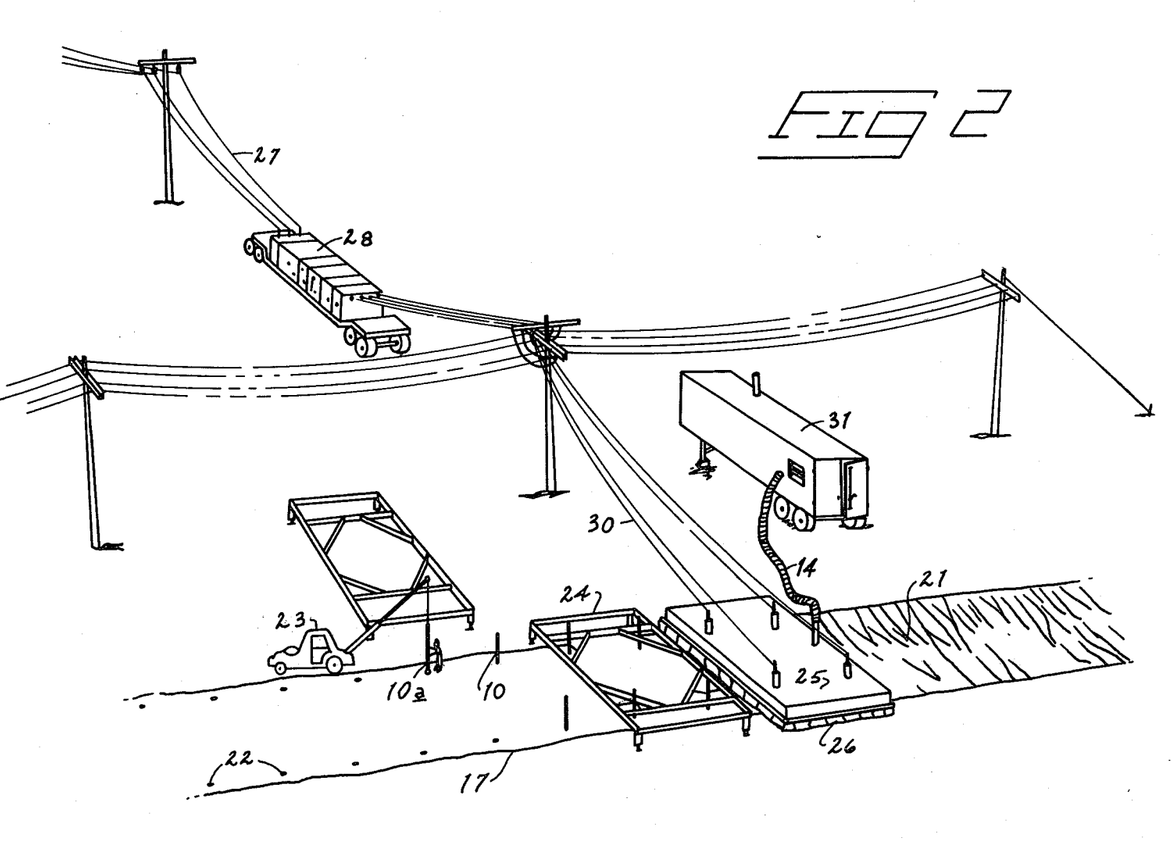
FIG. 2 is a schematic perspective view showing a vitrification process underway along a buried trench.
Figure 3:
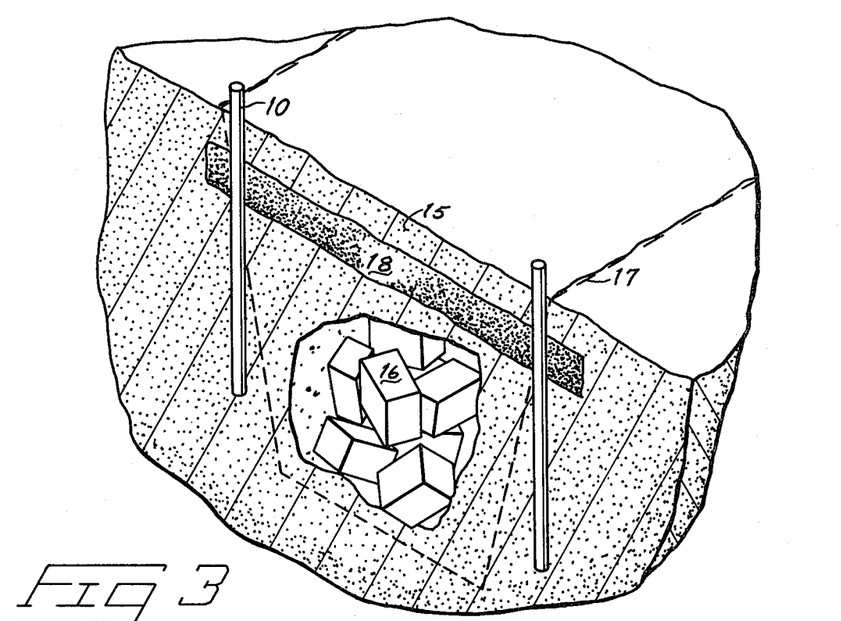
FIG. 3 is a schematic view illustrating preparation of a trench for vitrification.
Figure 4:
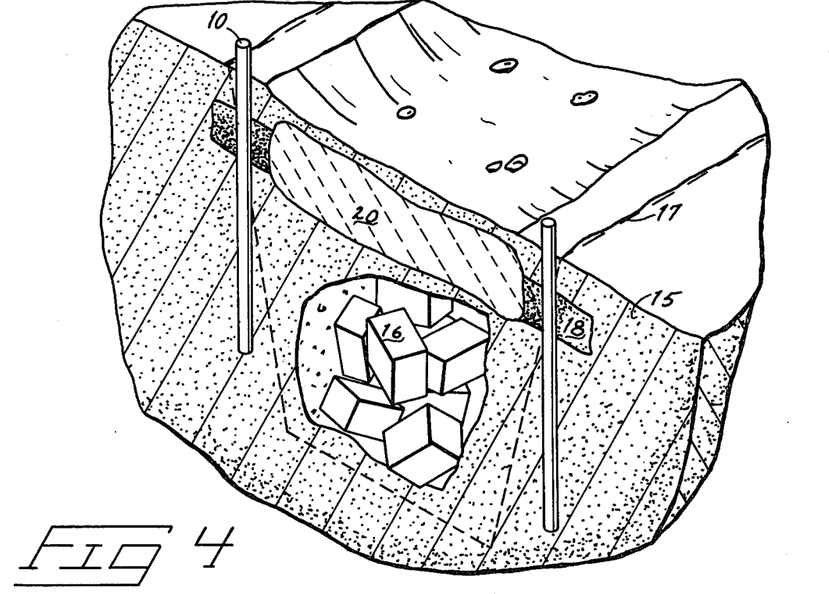
FIG. 4 is a schematic view illustrating melting of soil about an initial conductive resistance path.

FIG. 2 schematically illustrates the above-ground equipment that might be used in conjunction with this process. Again, a burial trench is outlined by lines 17. A previously vitrified zone along the trench is shown at 21. Drilled holes 22 are located along the sides of the trench for reception of electrodes 10. The drawing shows an electrode 10a being lowered into a hole 22 by a mobile crane 23.

The electrodes 10 in this exemplary apparatus are supported in groups of four within portable rigid frames shown at 24. These frames support electrical insulators for the individual electrodes 10, as well as a protective hood 25 made of glass impervious material and surrounded by a skirt 26 providing sealing engagement with the soil surfaces.

Electrical power is provided to the electrodes 10 through high voltage distribution lines 27 feeding a portable substation and control unit generally illustrated at 28. The required form of electrical power is then fed to supply lines illustrated at 30, which lead to the individual electrodes 10.

After vitrification has been completed within the area and length spanned by the operative group of four electrodes, they may be removed from the soil after termination of current to them and prior to solidification of the molten mass. The electrodes 10 can then be reused by reinserting them at a subsequent location along the trench. Evolved gases are conducted through conduit 14 to a portable scrubber or other gas processing equipment show generally at 31.

If continuous melting of soil areas is desired from the exposed soil surface downwardly, the frames 24 could be movably supported on wheels or tracks for transport along the length of trench 17.

The frame can be self-propelled or externally moved at a speed corresponding to the rate of soil melting, thereby keeping the electrodes within the pool of molten material.

We claim:

1. A method for in-situ vitrification of soil, comprising the following steps:
    inserting at least one pair of electrodes into the soil at spaced positions from one another;
    providing an initial electrically conductive resistance path in the soil across the electrodes;
    passing electrical current through the electrically conductive resistance path by application of current to the electrodes to heat the soil about the path to its melting temperature, thereby establishing a current-carrying pathway through the molten soil between the electrodes;
    continuing application of current to the electrodes until the soil between them and immediately adjacent to them has been melted; and
    terminating application of current to the electrodes to permit cooling and solidification of the melted soil into a solid mass.

2. A method as set out in claim 1 wherein the in-situ vitrification of soil is carried out elevationally above buried waste material.

3. A method as set out in claim 1 further comprising the step of removing the electrodes from the spoil prior to solidification.

4. A method as set out in claim 1 wherein the electrodes are inserted through the upper surface of the soil in parallel upright positions.

5. A method as set out in claim 4 wherein the soil is melted from its surface downwardly to an elevation below the lower ends of the electrodes, and comprising the following additional step: moving the electrodes horizontally within the boundaries of the melted soil.

6. A method for in-situ vitrification of buried waste material surrounded by soil at a waste disposal site, comprising the following steps:
    inserting at least one pair of electrodes into the soil at spaced positions spanning at least a portion of the buried waste material;
    providing an initial electrically conductive resistance path in the soil across the electrodes at an elevation above the waste material;
    passing electrical current through the electrically conductive resistance path by application of current to the electrodes to heat the soil about the path to its melting temperature thereby establishing a current-carrying pathway through the molten soil between the electrodes;
    continuing application of current to the electrodes until the soil between and immediately adjacent to them has been melted; and
    terminating application of current to the electrodes to permit cooling and solidification of the soil and any remaining waste materials between the electrode positions into a solid mass.

7. A method as set out in claim 6 further comprising the following step:

enclosing the soil surface area between and immediately surrounding the electrodes within a gas-impervious cover.

8. A method as set out in claim 6 further comprising the following step:
enclosing the soil surface area between and immediately surrounding the electrodes within a gas-impervious cover; and
removing gaseous materials from beneath the cover as they are evolved during the vitrification steps.

9. A method as set out in claim 6 wherein the electrodes are inserted through the upper surface of the soil in parallel upright positions.

10. A method as set out in claim 9 wherein the soil is melted from its surface downwardly to an elevation below the lower ends of the electrodes, and comprising the following additional step:
moving the electrodes horizontally within the boundaries of the melted soil.

11. A method as set out in claim 6 further comprising the step of removing the electrodes from the soil prior to its solidification.

12. A method as set out in claim 6 wherein the buried waste materials are arranged in an elongated sub-soil trench, comprising the following step:
inserting the electrodes in groups of four spanning at least a portion of the width of the trench and a portion of its length.

13. A method as set out in claim 6 wherein the buried waste materials are arranged in an elongated subsoil trench, comprising the following steps:
inserting the electrodes in groups of four spanning the width of the trench and a portion of its length; and
removing the electrodes after termination of current to them and prior to solidification of the molten mass.

14. A method as set out in claim 6 wherein the buried waste materials are arranged in an elongated subsoil trench, comprising the following steps:
inserting the electrodes in groups of four spanning the width of the trench and a portion of its length;
removing the electrodes after termination of current to them and prior to solidification of the molten mass; and
reinserting the electrodes at a subsequent location along the trench.

15. A method as set out in claim 1 wherein the buried waste material is radioactive.

* * * * *

UNITED STATES PATENT OFFICE
CERTIFICATE OF CORRECTION

Patent No. 4,376,598                      Dated    March 15, 1983

Inventor(s) Richard A. Brouns, James L. Buelt, William F. Bonner

It is certified that error appears in the above-identified patent and that said Letters Patent are hereby corrected as shown below:

In claim 15, line 1, delete "1" and insert --6-- therefor.

*Signed and Sealed this*

*First* Day of *November 1983*

[SEAL]

Attest:

Attesting Officer

GERALD J. MOSSINGHOFF
*Commissioner of Patents and Trademarks*

REEXAMINATION CERTIFICATE (1142nd)
United States Patent [19]

Brouns et al.

[11] B1 4,376,598

[45] Certificate Issued  Oct. 17, 1989

[54] IN-SITU VITRIFICATION OF SOIL

[75] Inventors: Richard A. Brouns, Kennewick; James L. Buelt; William F. Bonner, both of Richland, all of Wash.

[73] Assignee: The United States of America as represented by the United States Department of Energy, Washington, D.C.

Reexamination Request:
No. 90/001,507, May 5, 1988

Reexamination Certificate for:
Patent No.: 4,376,598
Issued: Mar. 15, 1983
Appl. No.: 251,663
Filed: Apr. 6, 1981

Certificate of Correction issued Mar. 15, 1983.

[51] Int. Cl.$^4$ .................................................. E02D 3/00
[52] U.S. Cl. ....................................... 405/258; 175/16; 299/14; 404/75; 405/131; 405/129
[58] Field of Search .................. 110/346, 246, 237; 252/626, 628, 633

[56]     References Cited
U.S. PATENT DOCUMENTS

| | | |
|---|---|---|
| 1,512,125 | 10/1924 | Mende . |
| 1,878,158 | 9/1932 | Lundy et al. . |
| 1,993,642 | 3/1935 | Aarts et al. . |
| 2,099,328 | 11/1937 | Casagrande . |
| 2,308,860 | 1/1943 | Clark . |
| 2,795,279 | 6/1957 | Savapuu . |
| 3,106,244 | 10/1963 | Parker . |
| 3,302,407 | 2/1967 | Every . |
| 3,332,884 | 7/1967 | Kelmar . |
| 3,466,873 | 9/1969 | Present . |
| 3,857,776 | 12/1974 | Titus et al. . |
| 3,916,993 | 11/1975 | Katz ................................. 166/248 |
| 3,983,050 | 2/1976 | Mecham .................... 252/301.1 W |
| 4,136,524 | 1/1979 | Holman ............................. 405/131 |
| 4,174,293 | 11/1979 | Colombo et al. ......... 252/301.1 W |
| 4,196,329 | 4/1980 | Rowland et al. ............... 219/10.81 |

FOREIGN PATENT DOCUMENTS

| | | |
|---|---|---|
| 45564 | 8/1972 | Australia . |
| 1320921 | 2/1963 | France . |
| 278054 | 9/1927 | United Kingdom . |
| 462987 | 3/1937 | United Kingdom . |
| 550683 | 1/1943 | United Kingdom . |
| 574044 | 12/1945 | United Kingdom . |
| 756582 | 9/1956 | United Kingdom . |
| 1480577 | 7/1977 | United Kingdom . |

OTHER PUBLICATIONS

Canadian Journal of Research, issued by The National Research Council of Canada, May 1939, vol. 17, Sec. B, No. 5.

Primary Examiner—Dennis L. Taylor

[57]    ABSTRACT

A method of vitrifying soil at or below a soil surface location. Two or more conductive electrodes are inserted into the soil for heating of the soil mass between them to a temperature above its melting temperature. Materials in the soil, such as buried waste, can thereby be effectively immobilized.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 53–59:
It is to be understood that melting of the soil can be terminated prior to complete melting of the [burial] *buried waste materials if only a cover of vitreous material is desired. This method readily lends itself to the control necessary to cover or encapsulate waste materials buried in soil, as well as to produce a homogeneous vitrified mass of soil and waste materials components.*

AS A RESULT OF REEXAMINATION, IT HAS BEEN DETERMINED THAT:

Claims 5, 10, and 12–14 are cancelled.

Claims 1–3, 6 and 8 are determined to be patentable as amended.

Claims 4, 7, 9, 11 and 15, dependent on an amended claim, are determined to be patentable.

New claims 16–31 are added and determined to be patentable.

1. A method for in-situ vitrification of soil, comprising the following steps:
    inserting at least one pair of electrodes into [the] soil *in the ground* at spaced positions from one another;
    providing an initial electrically conductive resistance path in the soil across the electrodes;
    passing electrical current through the electrically conductive resistance path by application of current to the electrodes to heat the soil about the path to its melting temperature, thereby establishing a current-carrying pathway through the molten soil between the electrodes;
    continuing application of current to the electrodes until the soil between them and immediately adjacent to them has been melted; [and]
    *retaining said melted soil in the ground; and*
    terminating application of current to the electrodes to permit cooling and solidification of *substantially all* the melted soil *in situ between the electrode positions* into a solid mass.

2. A method as set out in claim 1 wherein the in-situ vitrification of soil is carried out elevationally above buried waste material *to form a cover comprising said solid mass over said buried waste material.*

3. A method as set out in claim 1 further comprising the step of removing the electrodes from the [spoil] *soil* prior to solidification.

6. A method for in-situ vitrification of buried waste material surrounded by soil at a waste disposal site, comprising the following steps:
    inserting at least one pair of electrodes into the soil at spaced positions spanning at least a portion of the buried waste material;
    providing an initial electrically conductive resistance path in the soil across the electrodes at an elevation above the waste material;
    passing electrical current through the electrically conductive resistance path by application of current to the electrodes to heat the soil about the path to its melting temperature thereby establishing a current-carrying pathway through the molten soil between the electrodes;
    continuing application of current to the electrodes until the soil between and immediately adjacent to them has been melted *and engulfs or destroys said portion of buried waste material*; and
    terminating application of current to the electrodes to permit cooling and solidification of the soil and any remaining waste materials between the electrode positions *in situ* into a solid mass *encapsulating waste material.*

8. A method as set out in claim 6 further comprising the following [step] *steps*:
    enclosing the soil surface area between and immediately surrounding the electrodes within a gas-impervious cover; and
    removing gaseous materials from beneath the cover as they are evolved during the vitrification steps.

*16. A method for in-situ vitrification of buried waste material in admixture with soil at a waste disposal site, comprising the following steps:*
    *inserting at least one pair of electrodes into the soil at spaced positions spanning at least a portion of the buried waste material;*
    *providing an initial electrically conductive path in the soil across the electrodes;*
    *passing electrical current through the electrically conductive path by application of current to the electrodes to heat the soil about the path to its melting temperature to establish a current-carrying pathway through the molten soil containing waste material between the electrode positions;*
    *continuing application of current to the electrodes until the soil between and immediately adjacent to them has been melted and engulfs said portion of waste material; and*
    *terminating application of current to the electrodes to permit cooling and solidification of the soil and any remaining waste material between the electrode positions in situ into a solid mass of vitrified soil encasing at least the remaining waste material of said portion.*

*17. A method as set out in claim 16 further comprising the following steps:*
    *enclosing the soil surface area between and immediately surrounding the electrodes within a gas-collecting cover; and*
    *removing gaseous materials from beneath the cover as they are evolved during the vitrification step.*

*18. A method as set out in claim 16 wherein the buried waste material is radioactive.*

*19. A method as set out in claim 16 wherein said current applied to said electrodes is continued until said soil is heated to at least about 1450° C. for melting said soil.*

*20. A method as set out in claim 16 wherein said electrically conductive path is a resistance path.*

21. A method as set out in claim 16 wherein the electrodes of said pair are inserted into the soil in a manner spanning a mass of said soil with said portion of buried waste material being located substantially between said electrodes.

22. A method as set out in claim 16 wherein the buried waste material comprises hazardous waste material.

23. A method as set out in claim 22 wherein the hazardous waste material comprises organic material.

24. A method as set out in claim 16 wherein said initial electrically conductive path comprises a layer of graphite disposed between said electrodes of said pair.

25. A method for in-situ vitrification of soil, comprising the following steps:

inserting at least one pair of electrodes into the soil at spaced positions from one another, wherein the electrodes are inserted through the upper surface of the soil in parallel upright positions;

providing an initially electrically conductive resistance path in the soil across the electrodes;

passing electrical current through the electrically conductive resistance path by application of current to the electrodes to heat the soil about the path to its melting temperature, thereby establishing a current-carrying pathway through the molten soil between the electrodes;

continuing application of current to the electrodes until the soil between them and immediately adjacent to them has been melted, wherein the soil is melted from its surface downwardly to an elevation below the lower ends of the electrodes, moving the electrodes horizontally within the boundaries of the melted soil; and terminating application of current to the electrodes to permit cooling and solidification of the melted soil into a solid mass.

26. A method for in-situ vitrification of buried waste material surrounded by soil at a waste disposal site, comprising the following steps:

inserting at least one pair of electrodes into the soil at spaced positions spanning at least a portion of the buried waste material, wherein the electrodes are inserted through the upper surface of the soil in parallel upright positions;

providing an initial electrically conductive resistance path in the soil across the electrodes at an elevation above the waste material;

passing electrical current through the electrically conductive resistance path by application of current to the electrodes to heat the soil about the path to its melting temperature thereby establishing a current-carrying pathway through the molten soil between the electrodes;

continuing application of current to the electrodes until the soil between and immediately adjacent to them has been melted, wherein the soil is melted from its surface downwardly to an elevation below the lower ends of the electrodes;

moving the electrodes horizontally within the boundaries of the melted soil; and terminating application of current to the electrodes to permit cooling and solidification of the soil and any remaining waste materials between the electrode positions into a solid mass.

27. A method for in-situ vitrification of buried waste materials surrounded by soil at a waste disposal site, wherein the buried waste materials are arranged in an elongated sub-soil trench, comprising the following steps:

inserting pairs of electrodes into the soil at spaced positions spanning at least a portion of the buried waste material, wherein the electrodes are inserted in groups of four spanning at least a portion of the width of the trench and a portion of its length;

providing an initially electrically conductive resistance path in the soil across electrodes of a pair at an elevation above the waste material;

passing electrical current through the electrically conductive resistance path by application of current to the electrodes to heat the soil about the path to its melting temperature thereby establishing a current-carrying pathway through the molten soil between the electrodes;

continuing application of current to the electrodes until the soil between and immediately adjacent to them has been melted; and terminating application of current to the electrodes to permit cooling and solidification of the soil and any remaining waste materials between the electrode positions into a solid mass.

28. A method for in-situ vitrification of buried waste materials surrounded by soil at a waste disposal site, wherein the buried waste materials are arranged in an elongated sub-soil trench, comprising the following steps:

inserting pairs of electrodes into the soil at spaced positions spanning at least a portion of the buried waste material, wherein the electrodes are inserted in groups of four spanning at least a portion of the width of the trench and a portion of its length;

providing an initial electrically conductive resistance path in the soil across electrodes of a pair at an elevation above the waste material;

passing electrical current through the electrically conductive resistance path by application of current to the electrodes to heat the soil about the path to its melting temperature thereby establishing a current-carrying pathway through the molten soil between the electrodes;

continuing application of current to the electrodes until the soil between and immediately adjacent to them has been melted;

terminating application of current to the electrodes to permit cooling and solidification of the soil and any remaining waste materials between the electrode positions into a solid mass; and removing the electrodes after termination of current to them and prior to solidification of the molten mass.

29. A method as set out in claim 28 further including the step of reinserting the removed electrodes at a subsequent location along the trench.

30. A method for in-situ vitrification of buried waste material in admixture with soil at a waste disposal site, comprising the following steps:

inserting at least one pair of electrodes into the soil at spaced positions spanning at least a portion of the buried waste material;

providing an electrically conductive path in the soil across the electrodes;

enclosing the soil surface area between and immediately surrounding the electrodes within a gas-collecting cover;

passing electrical current through the electrically conductive path by application of current to the electrodes to heat the soil about the path to its melting temperature, thereby establishing a current-carrying pathway through the molten soil between the electrodes;

continuing application of current to the electrodes until the soil between and immediately adjacent to them has been melted; and terminating application of current to the electrodes to permit cooling and solidification of the soil and any remaining waste material between the electrode positions into a solid mass of vitrified soil encasing at least the remaining waste material of said portion.

31. A method as set out in claim 1 wherein the in-situ vitrification of soil is carried out initially elevationally above said buried waste material and is continued until said molten soil downwardly engulfs said buried waste material.

* * * * *